June 5, 1923.

T. V. BARTON 1,457,489

COMBINED FOOT BRAKE AND ACCELERATOR CONTROL MECHANISM FOR AUTOMOBILES

Filed May 3, 1922 2 Sheets-Sheet 1

INVENTOR
Theodore V. Barton
BY
Frank L. Wor,
ATTORNEY

June 5, 1923.
T. V. BARTON
1,457,489
COMBINED FOOT BRAKE AND ACCELERATOR CONTROL MECHANISM FOR AUTOMOBILES
Filed May 3, 1922   2 Sheets-Sheet 2
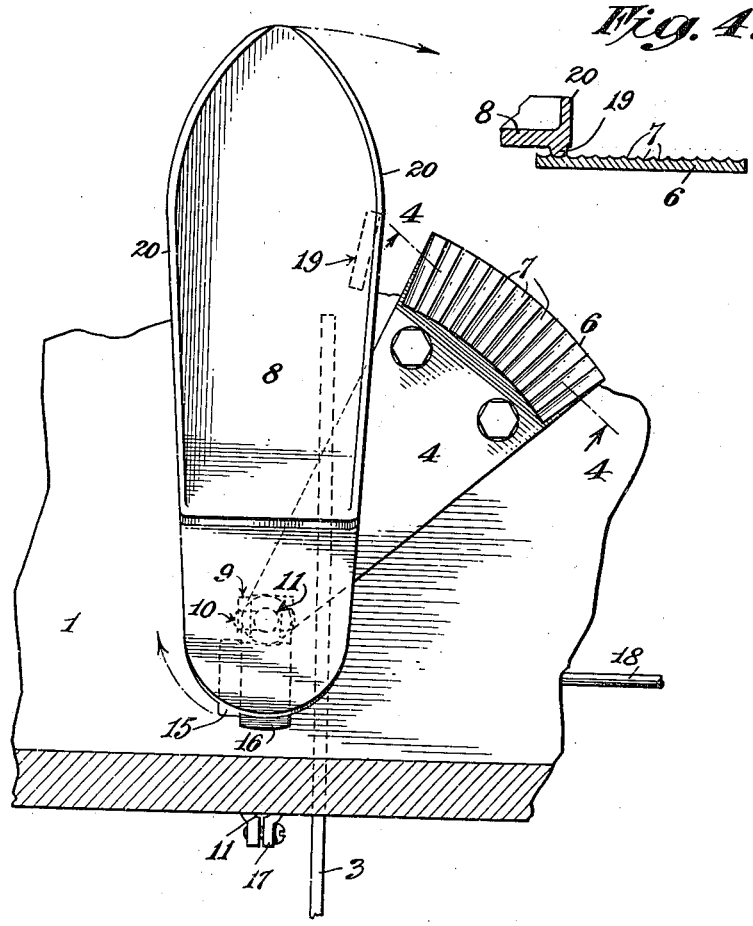
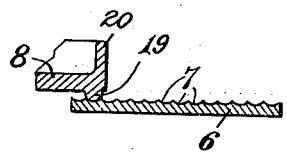
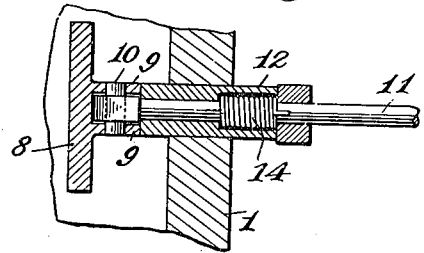
INVENTOR
Theodore V. Barton
BY
Frank L. Dyer
ATTORNEY Patented June 5, 1923.

1,457,489

UNITED STATES PATENT OFFICE.

THEODORE V. BARTON, OF NEW YORK, N. Y.

COMBINED FOOT BRAKE AND ACCELERATOR CONTROL MECHANISM FOR AUTOMOBILES.

Application filed May 3, 1922. Serial No. 558,186.

To all whom it may concern:

Be it known that I, THEODORE V. BARTON, a citizen of the United States, and a resident of the borough of Manhattan, city, county, and State of New York, have invented certain Improvements in Combined Foot Brake and Accelerator Control Mechanism for Automobiles, of which the following is a full, clear, and exact description.

My invention relates to improvements in combined foot brake and accelerator control mechanism for automobiles, and my object is to provide an effective and simple mechanism by means of which the usual foot brake can also be employed for controlling the accelerator mechanism of an automobile. Preferably the accelerator mechanism which is thus controlled by the foot brake is the usual throttle or butterfly valve, but if the automobile is provided with other accelerator mechanism, my improvements may be used therewith.

In carrying my invention into effect, I mount the ordinary foot pedal in such a way that it may be moved in one plane to operate the desired brake mechanism, and may be moved in another plane to operate the accelerator control mechanism, and the construction is such that when it is operated to perform one of these functions it cannot operate to perform the other function. Hence when the foot pedal is operated to actuate the brake, it cannot be operated to actuate the accelerator control mechanism, and when it is operated to actuate the accelerator control mechanism it cannot be operated to actuate the brake.

With my improved mechanism the brake is operated by a direct push on the foot pedal, and the accelerator mechanism is controlled by a twisting movement of the foot pedal, the mechanism providing ready and effective means by which the accelerator control may be maintained at the desired point of adjustment by pressing the foot pedal into engagement with a recess in a regulator plate, as I will more fully hereinafter describe and claim. The entire mechanism is simple in construction, and the operations are performed by easy and natural movements of the foot; at the same time I do away entirely with a very potent source of danger in a modern automobile, namely, a separate foot actuated accelerator which is frequently depressed by inexperienced drivers in moments of excitement when the desire is to operate the brake. Many accidents are due to this cause; the operator instead of bringing the car to rest by applying the brake drives it suddenly forward by applying the accelerator.

A very practical advantage of my present improvements is that they can be applied to any car using a foot brake and accelerator by simple tools and by an ordinary garage workman.

In order that the invention may be better understood, attention is directed to the accompanying drawings forming a part of this specification, and in which:

Fig. 3 is an elevation partly in section, showing the foot pedal and the regulator plate;

Figure 1:
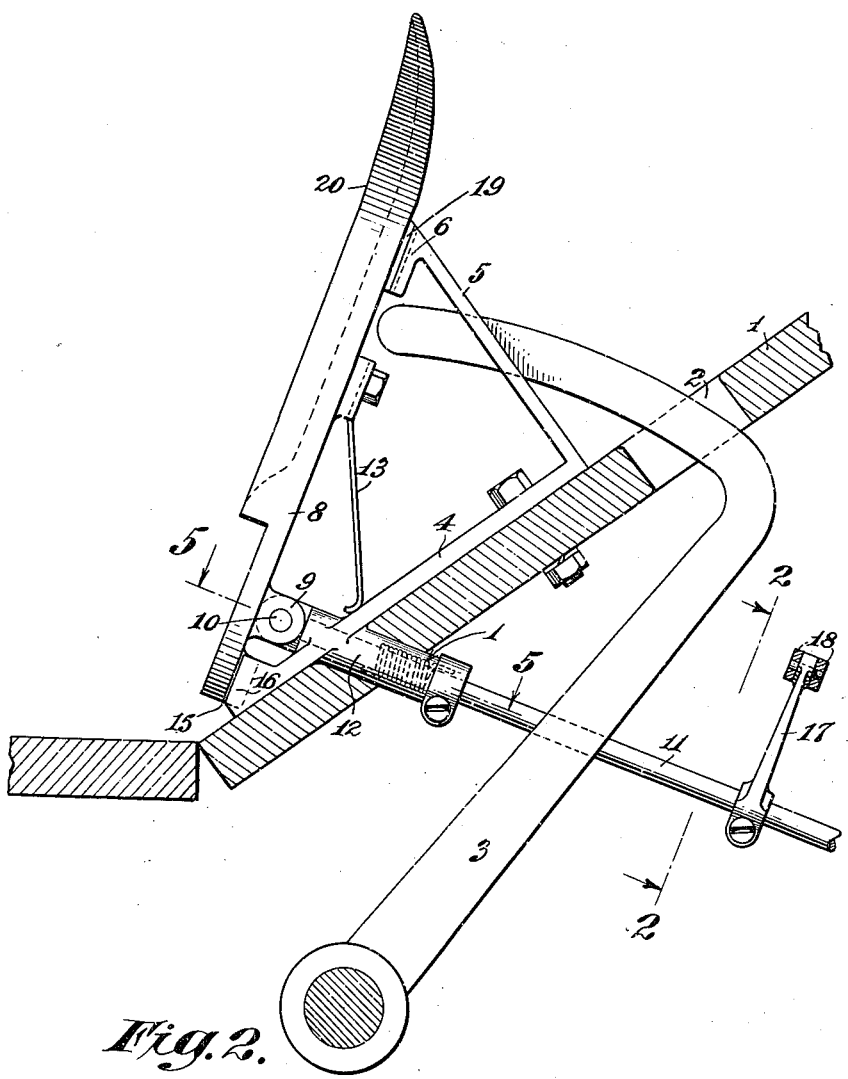
Fig. 1 is a sectional view taken through the floor board of an automobile, showing my present improvements for operating the foot brake and the accelerator control.
Figure 2:
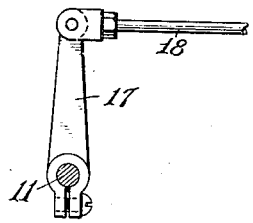
Fig. 2 is a sectional view on the line 2—2 of Fig. 1.

Fig. 4, a section on the line 4—4 of Fig. 3, for the purpose of illustrating the notches in the regulated place; and Fig. 5, a section on the line 5—5 of Fig. 1.

In all of these views corresponding parts are represented by the same numerals.

The floor board 1 of the automobile is provided with an opening 2 therein, through which extends the lever 3 for operating the brake in the usual way. A plate 4 is bolted to the floor board 1 as shown, and is provided with an upright member 5 formed with a regulator plate 6 thereon, having notches 7 as shown in Fig. 4. The foot pedal 8 is formed with ears 9—9, and is pivoted on a pin 10 (see Fig. 5) on the end of a rod 11 mounted in the bearing 12 in the floor board. By reason of this construction the foot pedal may be depressed to operate the brake lever 3, being returned to its normal position by a leaf spring 13. Surrounding the shaft 11 is a coil spring 14 (see Fig. 5) which normally twists the foot pedal to the position shown in Fig. 3, bringing a step 15 thereon into engagement with a projection 16 on the plate 4. Mounted on the shaft 11 is an arm 17 from which leads a rod 18 to the throttle or butterfly valve or other accelerator mechanism. It will be observed that when the foot pedal is given a twisting movement to one side the shaft 11 will be operated to thus control the accelerator mechanism. On the bottom of the foot pedal I provide a lug 19 adapted to engage one of the recesses 7 in the regulator plate 6. Normally the lug 19 moves in a path a short distance away from the face of the regulator plate so that when the accelerator has been adjusted to the proper point the foot pedal is slightly depressed to thereby engage the lug 19 with one of the recesses 7 and thus hold the accelerator in its position of adjustment. In order to more effectively operate the foot pedal I preferably form it with a rim 20 extending on one or both sides thereof, and with which the sole of the foot of the operator will engage to give the desired twisting movement thereto. It will be observed that when the foot pedal 20 is in the normal braking position shown in Fig. 3, and is depressed to operate the brake, it cannot operate the accelerator because a twisting movement thereof will be opposed by the engagement of the foot pedal with the member 5. If the foot pedal however is twisted to one side to operate the accelerator, it cannot be pressed down to operate the brake because the lug 19 will engage the regulator plate 6.

Having now described my invention, what I claim as new therein and desire to secure by Letters Patent is as follows:

1. In an automobile, the combination with braking and accelerator mechanism, of a foot pedal movable in two distinct planes for operating the brake mechanism and accelerator mechanism respectively, means whereby the pedal cooperates with the brake mechanism when it moves in one plane, means whereby the pedal cooperates with the accelerator mechanism when it moves in the other plane, and means for locking the pedal against movement in either plane when it is moved in the other plane, substantially as set forth.

2. In an automobile, the combination with braking and accelerator mechanism, of a shaft and a foot pedal hinged upon said shaft, means whereby the said foot pedal may be depressed to operate the brake mechanism and means whereby when the pedal is twisted to partially rotate said shaft it will operate the accelerator mechanism, substantially as set forth.

3. In an automobile, the combination with braking and accelerator mechanism, of a shaft, a foot pedal hinged upon said shaft, means whereby the said foot pedal may be depressed to operate the brake mechanism, means whereby when the pedal is twisted to partially rotate said shaft it will operate the accelerator mechanism, and means for preventing said foot pedal from being twisted when it is depressed to operate the brake, substantially as set forth.

4. In an automobile, the combination with braking and accelerator mechanism, of a shaft, a foot pedal hinged upon said shaft, means whereby the said foot pedal may be depressed to operate the brake mechanism, means whereby when the pedal is twisted to partially rotate said shaft it will operate the accelerator mechanism, and means for preventing said foot pedal from being depressed when it is twisted to operate the accelerator mechanism, substantially as set forth.

5. In an automobile, the combination with braking and accelerator mechanism, of a shaft, a foot pedal hinged upon said shaft, means whereby the said foot pedal may be depressed to operate the brake mechanism, means whereby when the pedal is twisted to partially rotate said shaft it will operate the accelerator mechanism, and a notched regulator plate with which the foot pedal may engage in the desired position of its twisted adjustment, substantially as set forth.

This specification signed and witnessed this twenty-sixth day of April, 1922.

THEODORE V. BARTON.

Witnesses:
 EDITH INTERMANN,
 AGNES DORAN.